(12) United States Patent
Murray et al.

(10) Patent No.: US 7,230,954 B2
(45) Date of Patent: Jun. 12, 2007

(54) CROSS LINK INTRA-VEHICULAR DATA COMMUNICATION USING A FIELD COUPLED TRANSMISSION LINE

(75) Inventors: Brian T. Murray, Novi, MI (US); Clyde M. Callewaert, Shelby Township, MI (US)

(73) Assignee: Delphi Technologies, Inc., Troy, MI (US)

( * ) Notice: Subject to any disclaimer, the term of this patent is extended or adjusted under 35 U.S.C. 154(b) by 1154 days.

(21) Appl. No.: 10/004,691

(22) Filed: Dec. 4, 2001

(65) Prior Publication Data

US 2003/0104719 A1    Jun. 5, 2003

(51) Int. Cl.
| | |
|---|---|
| H04L 12/66 | (2006.01) |
| H04B 1/44 | (2006.01) |
| H04B 3/20 | (2006.01) |
| H05K 1/00 | (2006.01) |
| H01Q 1/38 | (2006.01) |
| H01Q 5/00 | (2006.01) |
| H01Q 9/04 | (2006.01) |

(52) U.S. Cl. ............... 370/463; 370/282; 370/289; 361/750; 343/700 MS

(58) Field of Classification Search ............ None
See application file for complete search history.

(56) References Cited

U.S. PATENT DOCUMENTS

| | | | |
|---|---|---|---|
| 3,760,278 A | | 9/1973 | Narbaits-Jaureguy et al. |
| 4,006,315 A | * | 2/1977 | Halstead .................... 455/41.1 |
| 4,408,285 A | * | 10/1983 | Sisson et al. ................ 702/56 |
| 5,101,171 A | * | 3/1992 | Redmond ............... 330/124 R |
| 5,140,696 A | * | 8/1992 | Fox ............................ 455/41.1 |
| 5,452,115 A | * | 9/1995 | Tomioka ..................... 398/75 |
| 5,637,402 A | | 6/1997 | Gay |
| 6,023,244 A | * | 2/2000 | Snygg et al. ........ 343/700 MS |
| 6,222,425 B1 | * | 4/2001 | Okada et al. ................ 333/1.1 |
| 6,256,557 B1 | | 7/2001 | Avila et al. |
| 6,424,900 B2 | | 7/2002 | Murray et al. |
| 6,467,065 B1 | | 10/2002 | Mendez et al. |
| 6,522,962 B2 | | 2/2003 | Millsap et al. |
| 6,526,510 B1 | * | 2/2003 | Kori et al. .................. 713/176 |
| 6,941,576 B2 | * | 9/2005 | Amit .......................... 725/143 |
| 7,092,403 B2 | * | 8/2006 | Takeuchi et al. ........... 370/465 |
| 2001/0006538 A1 | | 7/2001 | Simon et al. |
| 2001/0048716 A1 | * | 12/2001 | Gough et al. ............... 375/222 |
| 2002/0072329 A1 | * | 6/2002 | Bandeira et al. ............... 455/7 |

* cited by examiner

*Primary Examiner*—Chi Pham
*Assistant Examiner*—Ronald Abelson
(74) *Attorney, Agent, or Firm*—Michael D. Smith

(57) ABSTRACT

A vehicular communications network is disclosed. The network comprises a communications channel for propagating a signal therealong; a nodal communications system; and a signal coupling system coupled to the communications channel and to the nodal communications system for coupling a signal between the communications channel and the nodal communications system.

47 Claims, 8 Drawing Sheets

CROSS LINK INTRA-VEHICULAR DATA COMMUNICATION USING A FIELD COUPLED TRANSMISSION LINE

TECHNICAL FIELD

This invention relates generally to a system and method for coupling a signal into and out of a vehicular communications channel.

BACKGROUND OF THE INVENTION

Common braid-shielded coaxial cable is typically comprised of an outer cylindrical conducting shell which is coaxial with an inner cylindrical conductor, thus forming an annular space therebetween. The annular space is usually filled with a low loss dielectric acting as the medium of propagation of a signal along the cable. Within the coaxial cable the dominant mode transverse electric and magnetic fields (TEM) of the signal propagate along the cable with the electric field radial to the inner conductor and terminating at the braided outer conductor. At high frequencies, gaps within the braided outer conductor allow a portion of the electric field of the propagating signal to leak out of the cable and terminate on the outer side of the braided layer. Normally, this leakage of the signal is undesirable. It leads to degradation or attenuation of the propagating signal along the length of the cable. Also, two coax cables placed in close proximity to one another and suffering from the above leakage, give rise to what is commonly known as "cross talk," i.e., the coupling of a signal propagating in one cable into the other cable and vice versa. Such cross talk leads to undesirable interference between signals in a communications network.

SUMMARY OF THE INVENTION

Signal leakage in a communications network may be utilized to advantage by purposely coupling a signal propagating along one communications channel into another, adjacent channel for transmission therealong; or conversely, by "listening" to a signal leaking out of a channel, i.e., as in a "wiretap," and profitably utilizing the leaked signal. The above coupling of signals between channels may be accomplished without physical penetration of the subject channel, thus minimizing the need for direct mechanical or electrical connections. In addition, multiple couplings can be accomplished and done so over any network topology.

Thus, a vehicular communications network offering low cost, high speed and robust communications is presented. The vehicular communications network comprises a communications channel for propagating a signal therealong; a nodal communications system; and a signal coupling system coupled to the communications channel and to the nodal communications system for coupling a signal between the communications channel and the nodal communications system.

DESCRIPTION OF THE DRAWINGS

FIG. 3A is a side view of the generalized schematic representation of the signal coupling system of FIG. 2;

FIG. 4A is a side view of the generalized schematic representation of the signal coupling system of FIG. 2 including an enclosure and an isolator;

DESCRIPTION OF THE PREFERRED EMBODIMENTS

Figure 1:
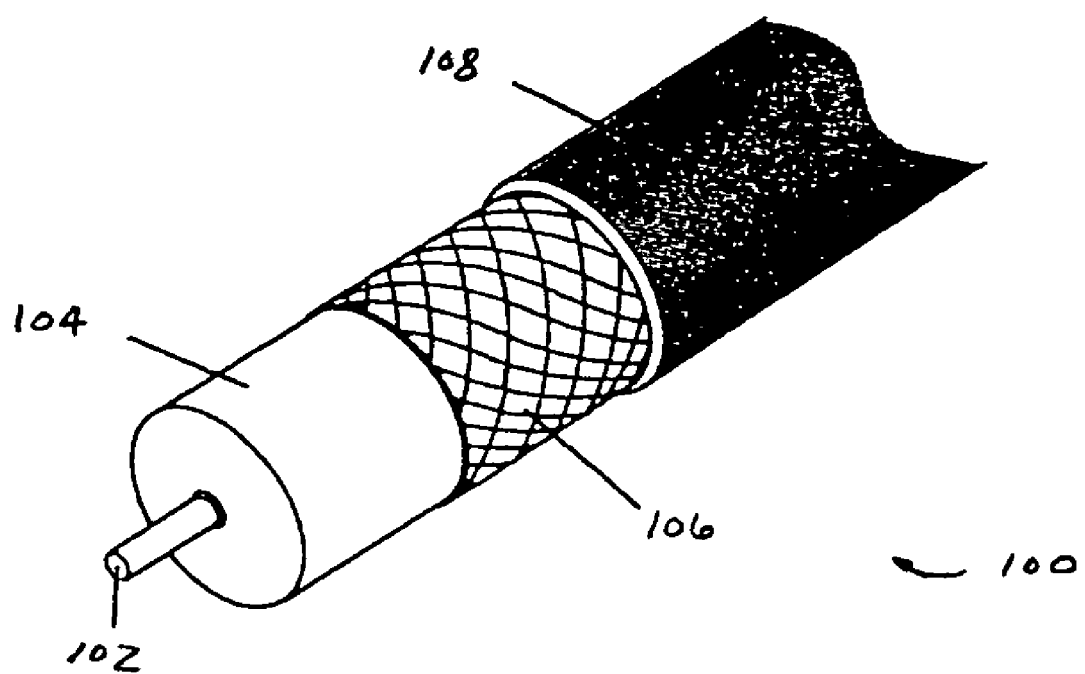
FIG. 1 is a diagrammatic representation of a coaxial cable.

A description of the preferred embodiments will now be had with reference to FIGS. 1 through 9 of the drawings. In FIG. 1 a typical coaxial cable 100 is shown. The coaxial cable 100 comprises a inner cylindrical conductor 102 surrounded by a dielectric material 104. The dielectric material 104 is in turn enveloped by a braided outer cylindrical conductor 106 and the entire arrangement is encompassed by a insulating cover 108. The dielectric material 104 acts as the medium of propagation of a signal along the coaxial cable 100.

Figure 2:
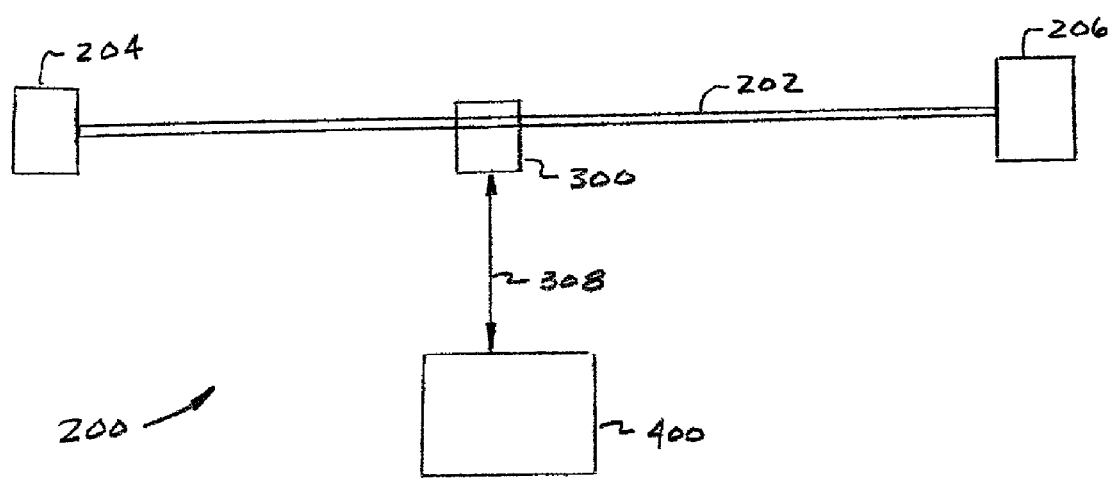
FIG. 2 is a generalized schematic representation of a communications network including a signal coupling system coupling a nodal communications system to a communications channel.

In FIG. 2, a generalized communications network 200 is shown. The communications network 200 comprises a communications channel 202 having a characteristic impedance, $Z_o$. The communications channel 202 is terminated at a first impedance 204 connected to a first end of the communications channel 202 and at a second impedance 206 connected to a second end of the communications channel 202. The communications network 200 further comprises at least one signal coupling system 300 coupled to the communications channel 200 and to at least one nodal communications system 400 providing thereby signal communication between the communications channel 202 and the nodal communications system 400. The first impedance 204 and the second impedance 206 typically possess an impedance, $Z_c$, equal to the characteristic impedance, $Z_o$, of the communications channel 202 in order to minimize the generation of standing waves in the communications channel 202. The first impedance 204 and the second impedance 206 may also comprise a transmitter and a receiver whereby the transmitter directs a signal to the receiver along the communications channel 202. Furthermore, the communications channel 202 may be one of a number of types of communications channels such as the coaxial cable 100 as shown in FIG. 1.

Figure 3:
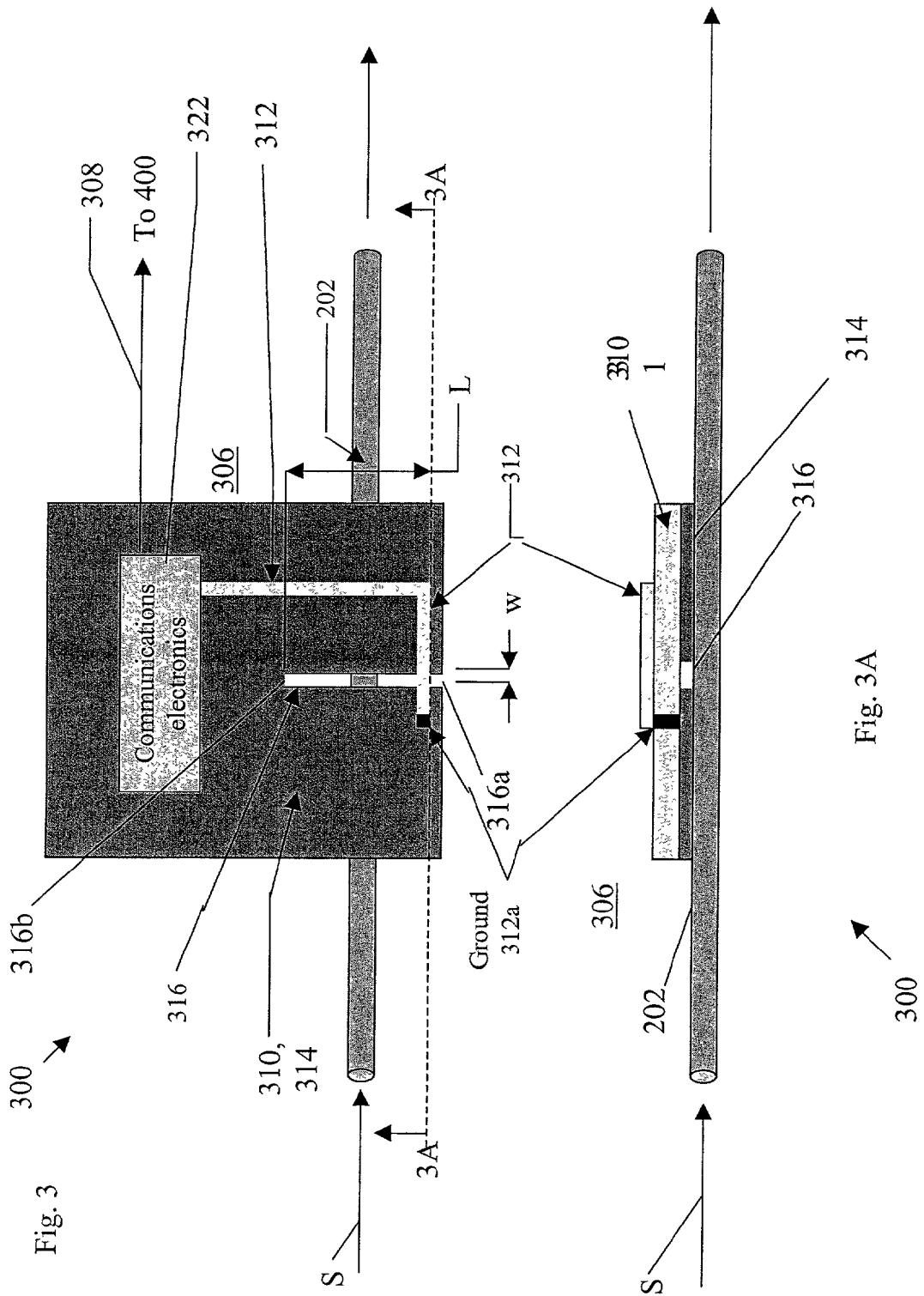
FIG. 3 is a top view of a generalized schematic representation of the signal coupling system of FIG. 2.

In FIGS. 3 and 3A the signal coupling system 300 is shown coupled to the communications channel 202 and to the nodal communications system 400. The signal coupling system 300 couples sufficient signal energy into or out of the communications channel 202 to support reliable communications for a given modulation scheme. The signal coupling system 300 utilizes a slot to microstrip line transition for coupling a signal, S, either from the communications channel 202 into the nodal communications system 400 or from the nodal communications system 400 into the communications channel 202. The signal coupling system 300 comprises a field coupling device 306 including a ground plane 314, a microstrip line 312, and a dielectric base 310, such as a printed circuit board (PCB).

The dielectric base 310 is positioned between the ground plane 314 and the microstrip line 312 and the ground plane 314 is positioned between the dielectric base 310 and the communications channel 202. The ground plane 314 includes a slot 316 of a specified width, w, and length, L. The width of the microstrip line 312 controls the characteristic impedance of the microstrip line 312. For a given substrate thickness and dielectric constant, there is a specific width associated with, for example, a 50 Ohm microstrip line. In conjunction with the slot 316 to microstrip line 312 crossover location, the widths thereof provide adjustable parameters to facilitate impedance matching. The microstrip line 312 is positioned across the slot 316 at approximately 90 degrees for maximum field coupling between the slot 316 and the microstrip line 312. The microstrip line 312 is also positioned near the open end 316a of the slot 316. The length of the slot 316 is substantially equal to one fourth of the wavelength ($\lambda/4$) of the signal coupled between the communications channel 202 and the nodal communications system 400.

Signal leakage from communications channel 202, such as the coaxial cable 100, drives high frequency currents on the outer side of the cable braid 106. These currents excite magnetic fields which encircle the coaxial cable 100 in a direction orthogonal to the axis of the cable. These magnetic fields are co-axial with the slot 316 and thus excite the slot 316. The slot 316 has maximum coupling at frequencies were its length, L, is (2N+1) quarter wavelengths (N=0, 1, 2, ... ). The impedance of the slot 316, where its length is one quarter wavelength (N=0), will range from zero Ohms at the shorted, or closed end 316b, to infinity at the open end 316a. To match the impedance of the microstrip line 312 to the slot 316 usually requires locating the microstrip line 312 near the open end 316a of the slot 316. The microstrip line 312 crosses the slot and is terminated to ground by way of a grounding connection 312a. This shorts the microstrip line 312 and creates high signal currents, which excite magnetic fields encircling the microstrip line 312 and are co-linear with the magnetic field within the slot 316 and hence couple strongly. This is the reason for having the microstrip line 312 cross the slot 316 at substantially 90 degrees. This coupling mechanism is efficient and compact.

The communications channel 202 is positioned perpendicular to, and substantially at the mid point of the length of the slot 316. Thus, as an example, leakage from a signal, S, propagating along the communications channel 202, is coupled out of the communications channel 202 through the slot 316, into the microstrip line 312 (spanning the slot 316) and into a communications circuit 322 for further propagation, at 308, to the nodal communications system 400. The transition from the microstrip transmission line 312 into the slot 316 used in this example to "listen" to the communications channel is compatible with surface mount electronics technology.

Figure 4:
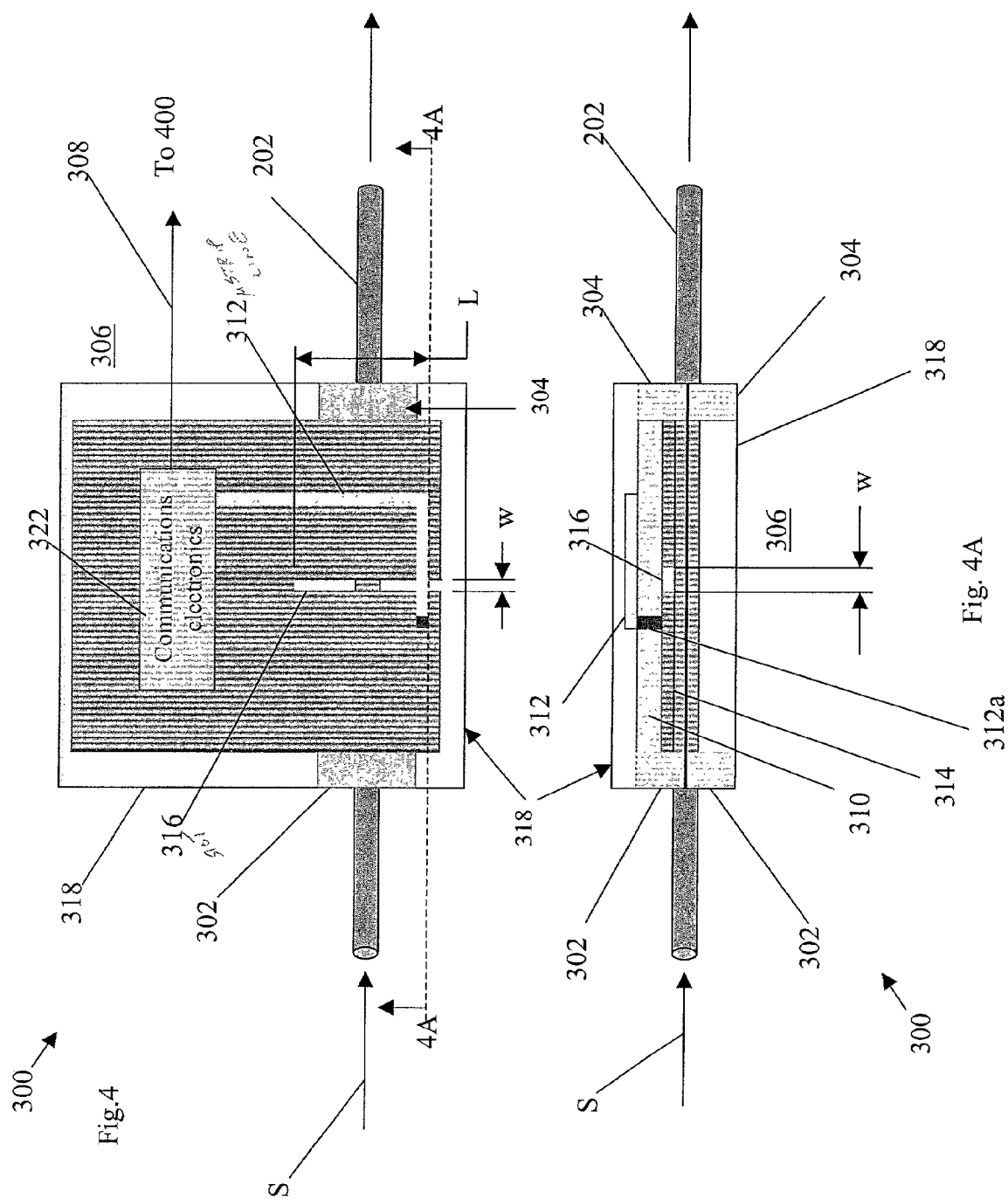
FIG. 4 is a top view of the generalized schematic representation of the signal coupling system of FIG. 2 including an enclosure and an isolator.

FIGS. 4 and 4A further depict the field coupling device 306 of FIGS. 3 and 3A. The field coupling device 306 is contained within a "clamshell" like enclosure 318. Included in the enclosure 318 is an isolator such as split-ferrite beads 302, 304 for suppressing both electromagnetic interference and unwanted propagation of signals along the outer side of the communications channel 202. The enclosure 318 encompasses or envelopes the communications channel 202 and the field coupling device 306 and serves to confine the communications channel 202 near the midpoint (L/2) of the length of the slot 316. The optimal location of the communications channel 202 must be determined experimentally. The actual location will likely be between the midpoint of the slot 316 and the open end 316a of the slot 316.

Figure 5:
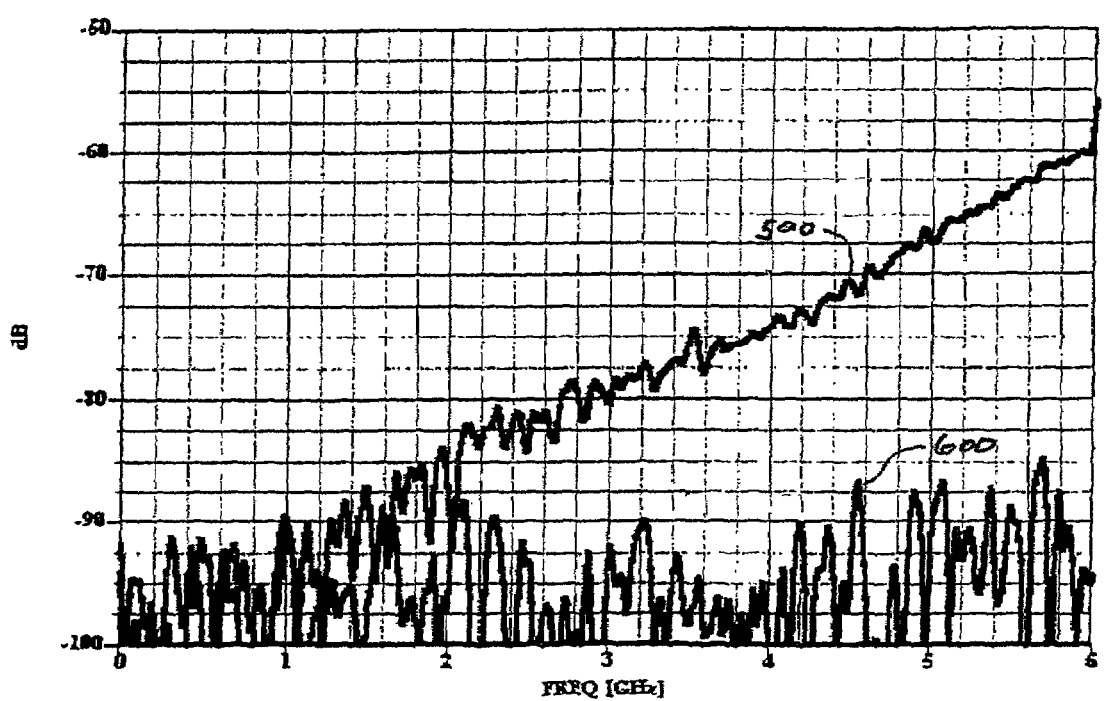
FIG. 5 is a graphical representation of the leakage from a coaxial cable of a propagating signal as a function of frequency.

The utility of the present invention can be seen with reference to FIG. 5. Therein depicted is a graphical representation of the power, in dB, of the leakage of a signal, S, propagating along a coaxial cable as a function of signal frequency, $f$, in Ghz. As seen in FIG. 5, the power of the leakage signal, as designated by the reference numeral 500, increases approximately linearly from about 1 Ghz and begins to depart from the noise signal 600 at approximately 2 Ghz and thus is thereafter available for useful processing thereof.

Figure 6:
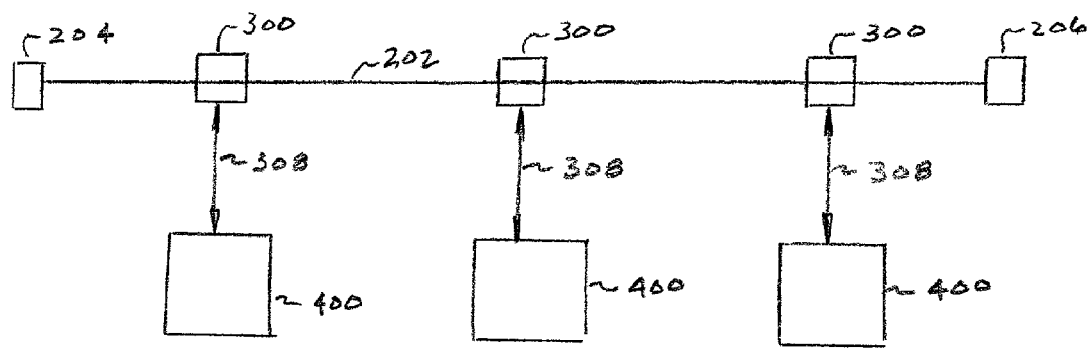
FIG. 6 is a generalized schematic representation of a communications network having a bus topology including a plurality of signal coupling systems coupled thereto.
Figure 7:
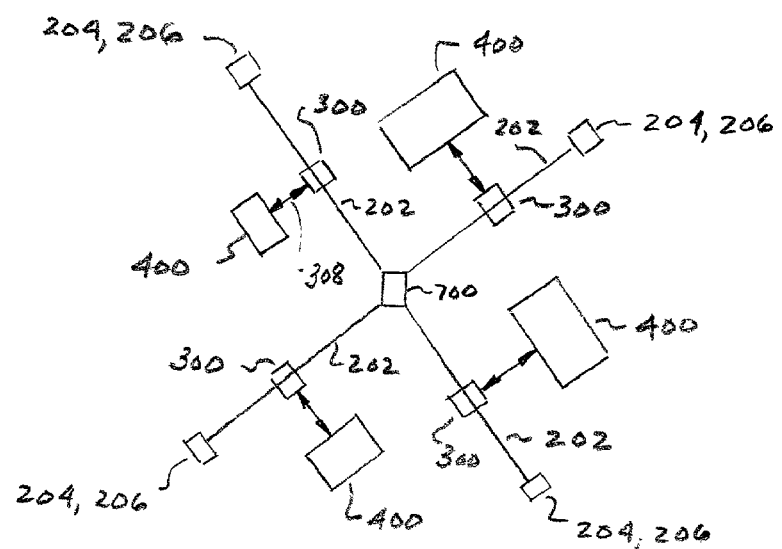
FIG. 7 is a generalized schematic representation of a communications network having a star topology including a plurality of signal coupling systems coupled thereto.
Figure 8:
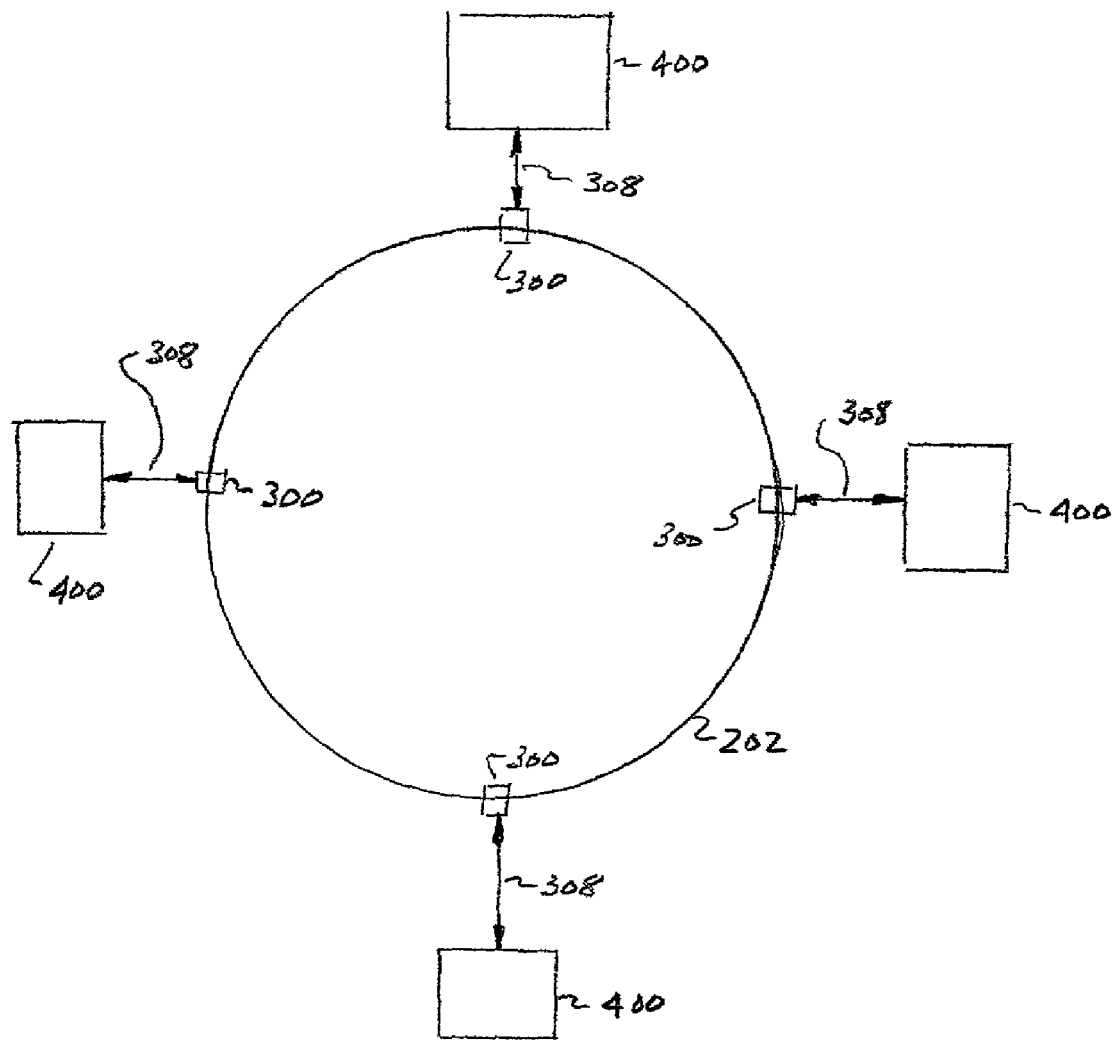
FIG. 8 is a generalized schematic representation of a communications network having a ring topology including a plurality of signal coupling systems coupled thereto.
Figure 9:
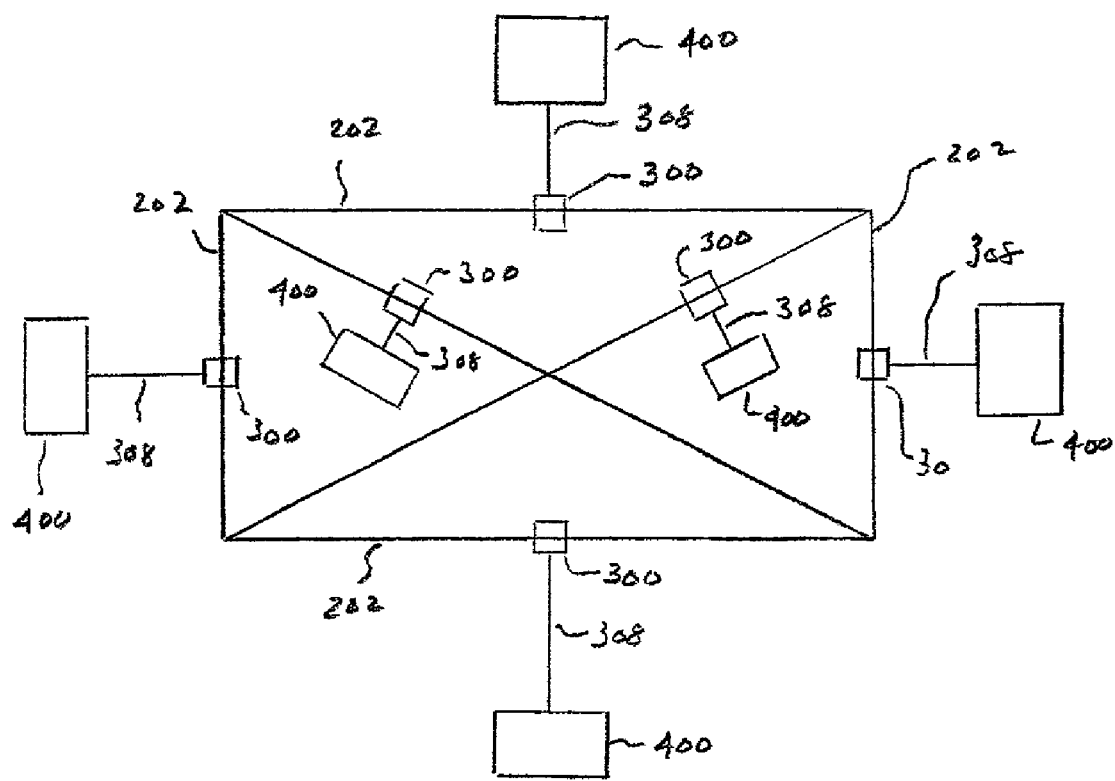
FIG. 9 is a generalized schematic representation of a communications network having a mesh topology including a plurality of signal coupling systems coupled thereto.

It will be appreciated from FIGS. 6, 7, 8 and 9 that the signal coupling system 300 of the present invention is operative in conjunction with any one of a plurality of network topologies. For instance, FIG. 6 depicts a plurality of the signal coupling systems 300 deployed in a bus topology. FIG. 7 depicts a plurality of the signal coupling systems 300 deployed in a star topology. FIG. 8 depicts a plurality of the signal coupling systems 300 deployed in ring topology and FIG. 9 depicts a plurality of the signal coupling systems 300 deployed in mesh topology.

It will also be appreciated that higher signal frequencies are required for adequate coupling thereof between the communications channel 202 and the nodal communications system 400. This provides an opportunity for increased bandwidth for digitally modulated carrier signals, giving rise to enhanced data rates. In addition, the large bandwidth of a coaxial communications channel can support simultaneous usage of multiple nodal communications systems 400 operating at separate frequencies. Because the leakage signal attenuates rapidly with increasing distance from the coaxial cable, this system can coexist with other high frequency systems without interaction.

The field coupling mechanism described herein utilizes a slot to microstrip line transition. The principal coupling mechanism is by field coupling (similar to transformers by analogy) which minimizes signal propagation through air and confines communication to within the coaxial cable. However, this invention also envisions the use antennas, e.g., microstrip antennas, to couple the signal between the communications channel 202 and the nodal communications system 400.

Thus from the foregoing description the vehicular communications network provides a signal coupling system that eliminates connections that require penetration of the coaxial cable, is rugged, lightweight, flexible, easy to service and inexpensive. In addition the system is capable of high data rates in both digital and analog modulation schemes and simultaneously supports multiple nodal communications systems in signal communication therebetween on a single communications channel at multiple frequencies.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting the claims.

What is claimed is:

1. A vehicular communications network comprising:
   a communications channel for propagating a signal therealong;
   a nodal communications system;
   a signal coupling system coupled to the communications channel and to the nodal communications system for coupling a signal between the communications channel and the nodal communications system;
   wherein the signal coupling system comprises a field coupling device comprising:
   a ground plane positioned in close proximity to the communications channel;
   a microstrip line connected to the ground plane;
   a dielectric base positioned between the microstrip line and the ground plane; and
   a communications circuit connected to the microstrip line and the nodal communications system.

2. The vehicular communications network as set forth in claim 1 further comprising:
   a first impedance connected to a first end of the communications channel; and
   a second impedance connected to the second end of the communications channel.

3. The vehicular communications network as set forth in claim 2 wherein the first impedance has an impedance equal to the characteristic impedance of the communications channel.

4. The vehicular communications network as set forth in claim 2 wherein the second impedance has an impedance equal to the characteristic impedance of the communications channel.

5. The vehicular communications network as set forth in claim 2 wherein the first impedance comprises a transmitter.

6. The vehicular communications network as set forth in claim 2 wherein the second impedance comprises a receiver.

7. The vehicular communications network as set forth in claim 1 wherein the communications channel comprises a coaxial cable.

8. The vehicular communications network as set forth in claim 1 wherein the ground plane includes a slot of prescribed width and length having an open end and a closed end.

9. The vehicular communications network as set forth in claim 8 wherein the length of the slot is substantially equal to one fourth of the wavelength of the signal coupled between the communications channel and the nodal communications system.

10. The vehicular communications network as set forth in claim 8 wherein the communications channel is positioned substantially near the midpoint of the length of the slot.

11. The vehicular communications network as set forth in claim 1 further comprising an isolator for suppressing both electro-magnetic interference and unwanted propagation of signals along the outer side of the communications channel.

12. The vehicular communications network as set forth in claim 11 wherein the isolator comprises at least one ferrite bead.

13. The vehicular communications network as set forth in claim 1 wherein the communications channel comprises a bus topology.

14. The vehicular communications network as set forth in claim 1 wherein the communications channel comprises a ring topology.

15. The vehicular communications network as set forth in claim 1 wherein the communications channel comprises a star topology.

16. The vehicular communications network as set forth in claim 8 further comprising an enclosure encompassing the communications channel and the field coupling device for confining the communications channel near the midpoint of the length of the slot.

17. The vehicular communications network as set forth in claim 1 wherein the communications channel comprises a mesh topology.

18. The vehicular communications network as set forth in claim 8 wherein the microstrip line is positioned across the slot at approximately 90 degrees for maximum field coupling between the slot and the microstrip line.

19. The vehicular communications network as set forth in claim 8 wherein the microstrip line is positioned near the open end of the slot.

20. A signal coupling system comprising a field coupling device positioned in close proximity to a communications channel for coupling a signal between the communications channel and a nodal communications system, said field coupling device comprising:
   a ground plane positioned in close proximity to the communications channel;
   a microstrip line connected to the ground plane;
   a dielectric base positioned between the microstrip line and the ground plane; and
   a communications circuit connected to the microstrip line and the nodal communications system.

21. The signal coupling system as set forth in claim 20 wherein the ground plane includes a slot of prescribed width and length.

22. The signal coupling system as set forth in claim 21 wherein the length of the slot is equal to one fourth of the wavelength of the signal.

23. The signal coupling system as set forth in claim 21 wherein the communications channel is positioned substantially near the midpoint of the length of the slot.

24. The signal coupling system as set forth in claim 20 further comprising an isolator for suppressing both electromagnetic interference and unwanted propagation of signals along the outer side of the communications channel.

25. The signal coupling system as set forth in claim 24 wherein the isolator comprises at least one ferrite bead.

26. The signal coupling system as set forth in claim 21 further comprising an enclosure encompassing the communications channel and the field coupling device for confining the communications channel near the midpoint of the length of the slot.

27. A vehicular communications network comprising:
   a communications channel for propagating a signal therealong;
   a nodal communications system;
   a field coupling device for coupling the signal between the communications channel and the nodal communications system;
   wherein the field coupling device comprises a ground plane positioned in close proximity to the communications channel;
   a microstrip line connected to the ground plane;
   a dielectric base positioned between the microstrip line and the ground plane; and
   a communications circuit connected to the microstrip line and the nodal communications system.

28. The vehicular communications network as set forth in claim 27 wherein the ground plane includes a slot of prescribed width and length having an open end and a closed end.

29. The vehicular communications network as set forth in claim 28 wherein the length of the slot is substantially equal to one fourth of the wavelength of the signal coupled between the communications channel and the nodal communications system.

30. The vehicular communications network as set forth in claim 28 wherein the communications channel is positioned substantially near the midpoint of the length of the slot.

31. The vehicular communications network as set forth in claim 27 further comprising an isolator for suppressing both electro-magnetic interference and unwanted propagation of signals along the outer side of the communications channel.

32. The vehicular communications network as set forth in claim 31 wherein the isolator comprises at least one ferrite bead.

33. The vehicular communications network as set forth in claim 27 wherein the communications channel comprises a bus topology.

34. The vehicular communications network as set forth in claim 27 wherein the communications channel comprises a ring topology.

35. The vehicular communications network as set forth in claim 27 wherein the communications channel comprises a star topology.

36. The vehicular communications network as set forth in claim 27 further comprising an enclosure encompassing the communications channel and the field coupling device for confining the communications channel near the midpoint of the length of the slot.

37. The vehicular communications network as set forth in claim 27 wherein the communications channel comprises a mesh topology.

38. The vehicular communications network as set forth in claim 28 wherein the microstrip line is positioned across the slot at approximately 90 degrees for maximum field coupling between the slot and the microstrip line.

39. The vehicular communications network as set forth in claim 28 wherein the microstrip line is positioned near the open end of the slot.

40. A field coupling device for coupling a signal between a communications channel and a nodal communications system, the field coupling device comprising:
    a ground plane positioned in close proximity to the communications channel;
    a microstrip line connected to the ground plane;
    a dielectric base positioned between the microstrip line and the ground plane; and
    a communications circuit connected to the microstrip line and the nodal communications system.

41. The field coupling device as set forth in claim 40 wherein the ground plane includes a slot of prescribed width and length.

42. The field coupling device as set forth in claim 41 wherein the length of the slot is equal to one fourth of the wavelength of the signal.

43. The signal coupling system as set forth in claim 41 wherein the communications channel is positioned substantially near the midpoint of the length of the slot.

44. The signal coupling system as set forth in claim 40 further comprising an isolator for suppressing both electro-magnetic interference and unwanted propagation of signals along the outer side of the communications channel.

45. The signal coupling system as set forth in claim 44 wherein the isolator comprises at least one ferrite bead.

46. The signal coupling system as set forth in claim 40 further comprising an enclosure encompassing the communications channel and the field coupling device for confining the communications channel near the midpoint of the length of the slot.

47. A method of field coupling a signal between a communications channel and a nodal communications system of a communications network, the method comprising:
    positioning a ground plane, having a slot of prescribed width and length, in close proximity to the communications channel, the communications channel substantially near the midpoint of the length of the slot and substantially perpendicular thereto;
    connecting a microstrip line to the ground plane;
    positioning a dielectric base between the microstrip line and the ground plane;
    exciting fields encircling the communications channel orthogonal to the axis of the communications channel exciting thereby fields encircling the microstrip line;
    coupling the fields encircling the communications channel with the fields encircling the microstrip line;
    connecting a communications circuit to the microstrip line and the nodal communications system; and
    propagating a signal, indicative of the coupled fields, along the communications circuit to the nodal communications system.

* * * * *